United States Patent
Okuno et al.

(10) Patent No.: US 6,338,613 B1
(45) Date of Patent: Jan. 15, 2002

(54) PISTON-TYPE COMPRESSOR

(75) Inventors: Takuya Okuno; Tetsuhiko Fukanuma; Masahiro Kawaguchi; Hiroshi Kubo, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/552,274

(22) Filed: Apr. 19, 2000

(30) Foreign Application Priority Data

Apr. 20, 1999 (JP) .......................................... 11-112227

(51) Int. Cl.[7] ................................................. F01B 3/02
(52) U.S. Cl. ......................... 417/222.2; 417/269; 92/71
(58) Field of Search ........................... 92/71; 417/222.2, 417/269

(56) References Cited

U.S. PATENT DOCUMENTS

| | | |
|---|---|---|
| 3,393,022 A | 7/1968 | Alven et al. |
| 4,428,718 A * | 1/1984 | Skinner .................... 417/222.2 |
| 5,094,590 A | 3/1992 | Carella et al. |
| 5,233,913 A | 8/1993 | Muirhead |
| 5,433,137 A * | 7/1995 | Ikeda et al. ................. 417/269 |
| 5,762,476 A * | 6/1998 | Ota et al. ................. 417/222.2 |

FOREIGN PATENT DOCUMENTS

| | | |
|---|---|---|
| EP | 0 814 263 A2 | 12/1997 |
| JP | 04-148082 | 5/1992 |
| JP | 07-301177 | 11/1995 |
| JP | 10-047242 | 2/1998 |

OTHER PUBLICATIONS

Communication from the European Patent Office regarding European Application No. 00108546.3 dated Feb. 1, 2001.

* cited by examiner

Primary Examiner—Michael Koczo
(74) Attorney, Agent, or Firm—Morgan & Finnegan, LLP

(57) ABSTRACT

A housing includes a crank chamber and cylinder bores. Pistons are accommodated in the cylinder bores. A drive shaft is supported by the housing to pass through the crank chamber. A lug plate is fixed to the drive shaft. The pistons are coupled to the lug plate, which converts rotation of the drive shaft into reciprocation of the pistons and compresses gas in the cylinder bores. A thrust bearing is located between the housing and the lug plate and transmits a thrust load applied to the lug plate. The thrust bearing includes a front race located next to the housing, a rear race located next to the lug plate, and rollers located between the front and rear races. A front seat for supporting the front race is formed on the housing. A rear seat for supporting the rear race is formed on the lug plate. The diameters of the front and rear seats are different, which causes elastic deformation of the races when a thrust load is applied.

14 Claims, 7 Drawing Sheets

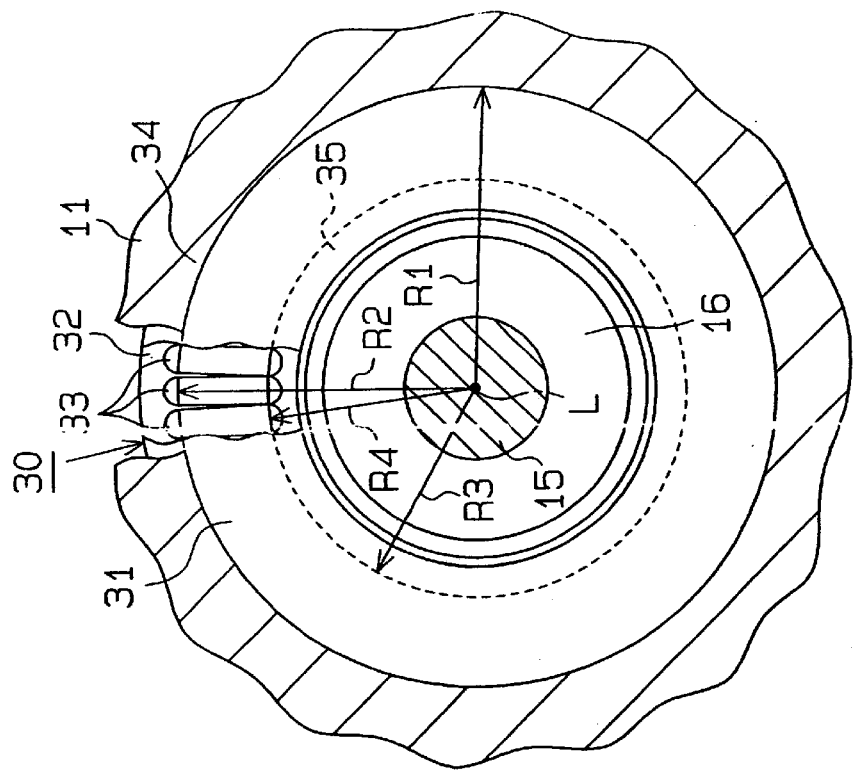
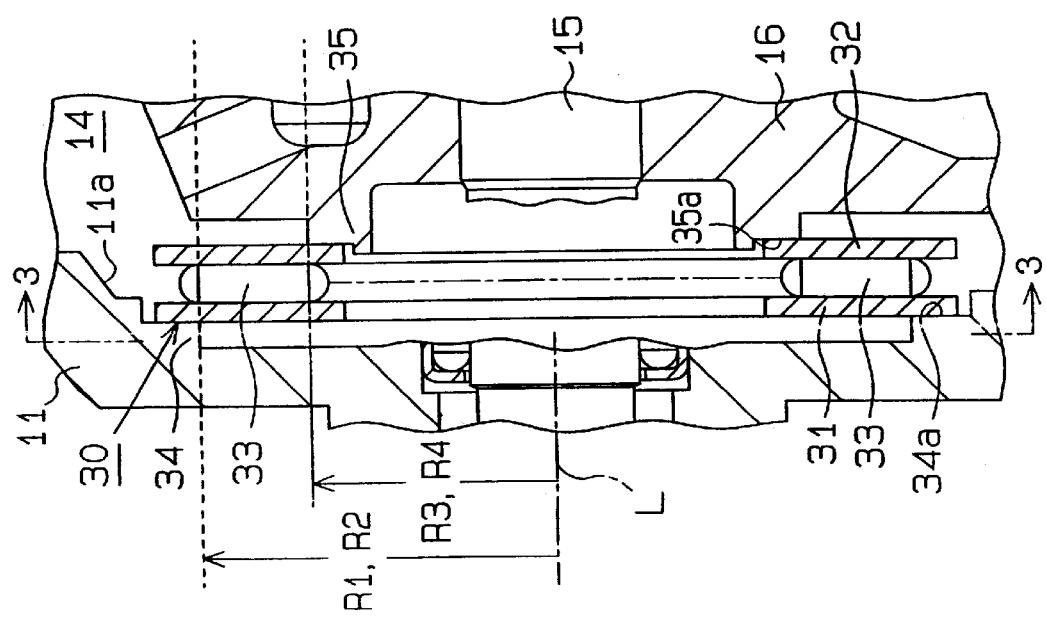

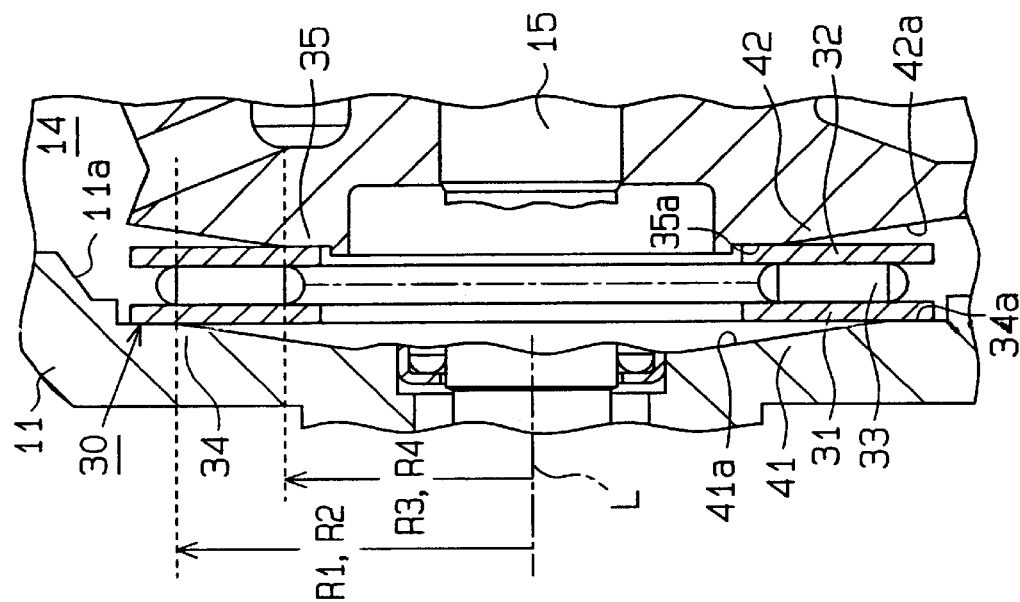

PISTON-TYPE COMPRESSOR

BACKGROUND OF THE INVENTION

The present invention relates to a piston-type compressor used, for example, in vehicle air-conditioners.

FIGS. 9 and 10 show a typical variable displacement compressor. A compressor housing 101 includes a crank chamber 102 and a rotatably supported drive shaft 103. A lug plate 104 is fixed to the drive shaft 103 in the crank chamber 102. A swash plate 105 is coupled to the lug plate 104 through a hinge mechanism 106. The lug plate 104 and the hinge mechanism 106 cause the swash plate 105 to rotate integrally with the drive shaft 103 and to incline relative to the drive shaft 103.

Six cylinder bores 107 are formed in the housing 101 and are arranged about the axis L of the drive shaft 103 at equal intervals. A piston 108 is accommodated in each cylinder bore 107 and is coupled to the swash plate 105 through shoes 109. When an external drive source, such as a vehicle engine, rotates the drive shaft 103, the swash plate is rotated by the lug plate 104 and the hinge mechanism 106. Rotation of the swash plate 105 is converted into reciprocation of the pistons 108 through the shoes 109. The reciprocation of the pistons 108 repeats a cycle of drawing refrigerant gas to the cylinder bores 107, compressing the refrigerant gas, and discharging the refrigerant gas from the cylinder bores 107.

A thrust bearing 110 is located between the housing 101 and the lug plate 104. The thrust bearing 110 receives a compression load, which is applied to the lug plate 104 through the pistons 108, the shoes 109, the swash plate 105, and the hinge mechanism 106.

A displacement control valve 111, which is an electromagnetic valve, varies the pressure in the crank chamber 102 and the compressor displacement in accordance with external signals, which are determined by the cooling load and the On/Off state-of the air-conditioning switch.

When each piston 108 moves from the bottom dead center to the top dead center, that is, in the compression stroke, refrigerant gas is compressed. When each piston 108 moves from the top dead center to the bottom dead center, that is, in the suction stroke, refrigerant gas is drawn to the corresponding cylinder bore 107.

As shown in FIG. 10, the swash plate 105 includes a location D1 corresponding to the top dead center position of the pistons 108 and a location D2 corresponding to the bottom dead center position of the pistons 108. The pistons 108 are in the compression stroke when coupled to the part from the top dead center location D1 to the bottom dead center location D2 in the rotation direction of the swash plate 105 (or drive shaft 103). That is, the pistons 108 that are coupled to the right side of the swash plate 105 from the imaginary plane H in FIG. 10 are in the compression stroke. The pistons 108 are in the suction stroke when coupled to the part from the bottom dead center location D2 to the top dead center location D1 in the rotation direction of the drive shaft 103. That is, the pistons 108 that are coupled to the left side of the swash plate 105 from the imaginary plane H in FIG. 10 are in the suction stroke. The imaginary plane H includes the top dead center location D1, the bottom dead center location D2, and the axis L.

Therefore, a pressing force directed toward the lug plate 104 is applied from the pistons 108 to the compression stroke side of the swash plate 105. On the other hand, a tractive force directed toward the cylinder bores 107 is applied from the pistons 108 to the suction stroke side of the swash plate 105. The tractive force is caused by the negative pressure in the cylinder bores 107.

Therefore, the force applied to one side of the swash plate 105 relative to the plane H is opposite to that applied to the other side. Accordingly, an inclination moment is applied to the piston-driving parts, which include the swash plate 105, the hinge mechanism 106, and the lug plate 104. This may incline the piston-driving parts relative to the housing 101 and may form a space between the lug plate 104 and the thrust bearing 110 and between the thrust bearing 110 and the housing 101. As a result, the rotation of the lug plate 104 may become unstable from chattering of the thrust bearing 110, and the lug plate 104 drives the thrust bearing 110 against the housing 101. This causes noise and vibration.

The illustrated compressor has a variable displacement. When the displacement is decreased, the control valve 111 increases the pressure in the crank chamber 102. As the pressure in the crank chamber 102 increases, the difference between the pressure in the crank chamber 102 applied to the front of the pistons 108 coupled to the compression stroke side and that in the cylinder bores 107 applied to the rear of the same pistons 108 decreases. At this time, the difference between the pressure in the crank chamber 102 applied to the front of the pistons 108 coupled to the suction stroke side and that in the cylinder bores 107 applied to the rear of the same pistons 108 increases. This increases the inclination moment applied to the piston-driving parts 104–106 and causes the previously mentioned problems.

There is a case in which the control valve 111, which is an electromagnetic valve controlled by the external signals, increases the pressure in the crank chamber 102 even if the cooling load is great. In other words, there is a case in which the displacement is decreased when the discharge pressure is high. In this case, the pressure in the crank chamber 102 increases to a very high level against the high pressure in the cylinder bores 107, which further increases the inclination moment applied to the piston-driving parts 104–106.

SUMMARY OF THE INVENTION

An objective of the present invention is to provide a piston-type compressor that reduces noise and vibration caused by the inclination of the piston-driving parts relative to the compressor housing.

To achieve the above objective, the present invention provides a piston-type compressor structured as follows. A housing includes a crank chamber and cylinder bores. Pistons are located in the corresponding cylinder bores. A drive shaft is supported by the housing and passes through the crank chamber. A piston-driving part is supported by the drive shaft in the crank chamber to rotate integrally with the drive shaft. The pistons are coupled to the piston-driving part. Gas in the cylinder bores is compressed when rotation of the drive shaft is converted into reciprocation of the pistons through the piston-driving part. A thrust bearing is located between the housing and the piston-driving part and receives a thrust load applied to the piston-driving part. The thrust bearing includes front and rear races and rolling elements located between the races. The front race is located between the rear race and the housing and the rear race is located between the front race and the piston-driving part. A front seat is formed on the housing for supporting the front race. A rear seat is formed on the piston-driving part for supporting the rear race. The diameters of the front and rear seats are different, which causes elastic deformation of the races when a thrust load is applied to the thrust bearing.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 2 is a partial enlarged cross-sectional view of the compressor of FIG. 1;

FIG. 3 is a cross-sectional view taken along the line 3—3 of FIG. 2.

FIG. 4 is a partial enlarged cross-sectional view illustrating elastic deformation of races of a thrust bearing;

FIG. 5 is a partial enlarged cross-sectional view showing a thrust bearing according to a second embodiment;

DETAILED DESCRIPTION OF THE PREFERRED EMBODIMENTS

First and second embodiments of the present invention will now be described. The description of the second embodiment will focus on the differences from the first embodiment, and the same reference numbers are used for the same parts.

First Embodiment

Figure 1:
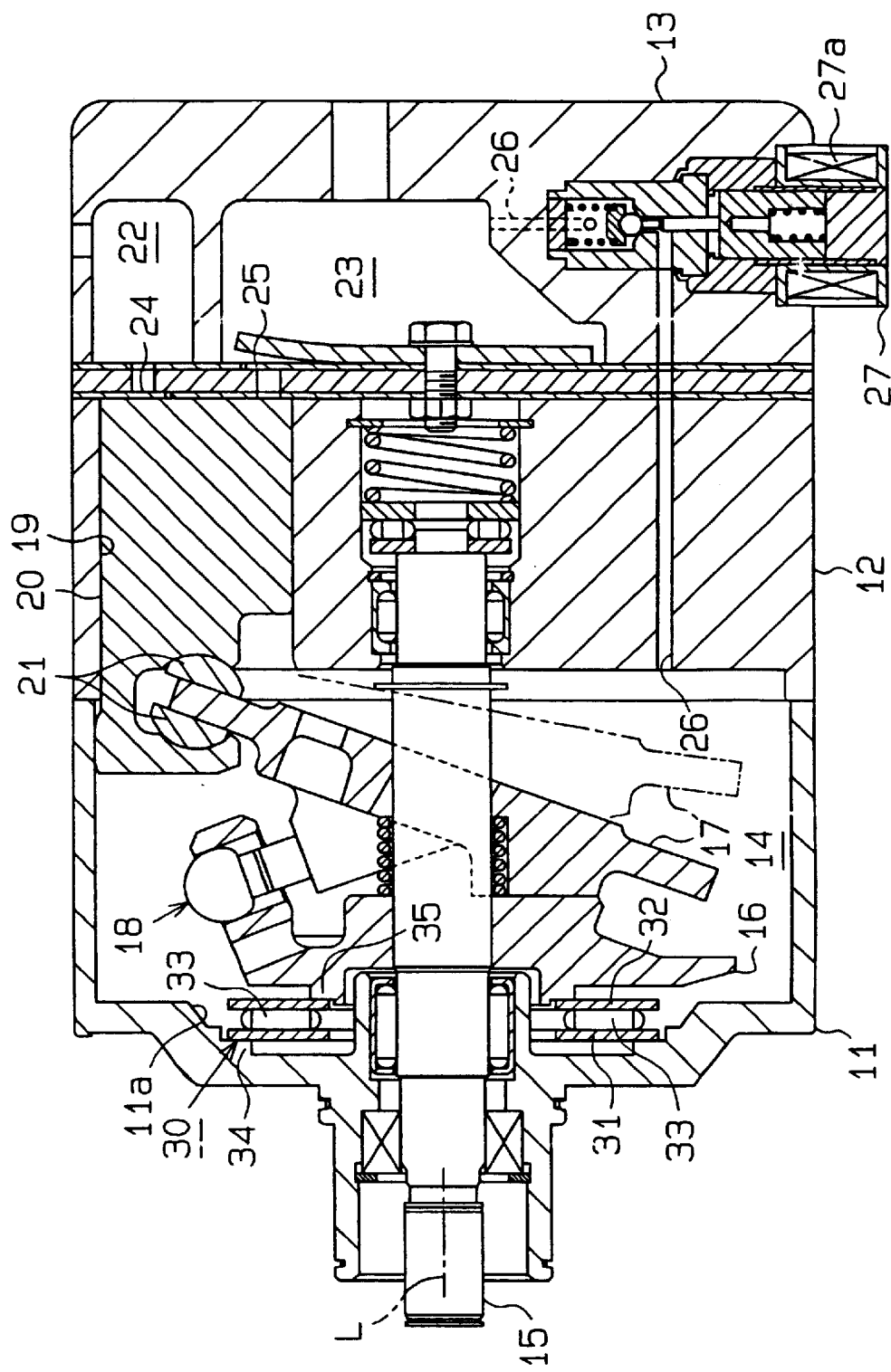
FIG. 1 is a longitudinal cross-sectional view of a variable displacement compressor.

As shown in FIG. 1, a front housing member 11 is coupled to the front of a cylinder block 12. A rear housing member 13 is coupled to the rear of the cylinder block 12. The front housing member 11, the cylinder block 12, and the rear housing member 13 form a compressor housing. A crank chamber 14 is defined by the front housing member 11 and the cylinder block 12. A drive shaft 15 passes through the crank chamber 14 and is supported by the front housing member 11 and the cylinder block 12.

A lug plate 16 is fixed to the drive shaft 15 in the crank chamber 14. A swash plate 17 is located in the crank chamber 14. A hinge mechanism 18 is located between the lug plate 16 and the swash plate 17. The lug plate 16 and the hinge mechanism 18 cause the swash plate 17 to rotate integrally with the drive shaft 15 and to incline relative to the axis L of the drive shaft 15. As shown by the broken line in FIG. 1, when the central part of the swash plate 17 slides toward the cylinder block 12, the inclination of the swash plate 17 decreases. When the central part of the swash plate 17 slides toward the lug plate 16, the inclination of the swash plate 17 increases.

Figure 10:
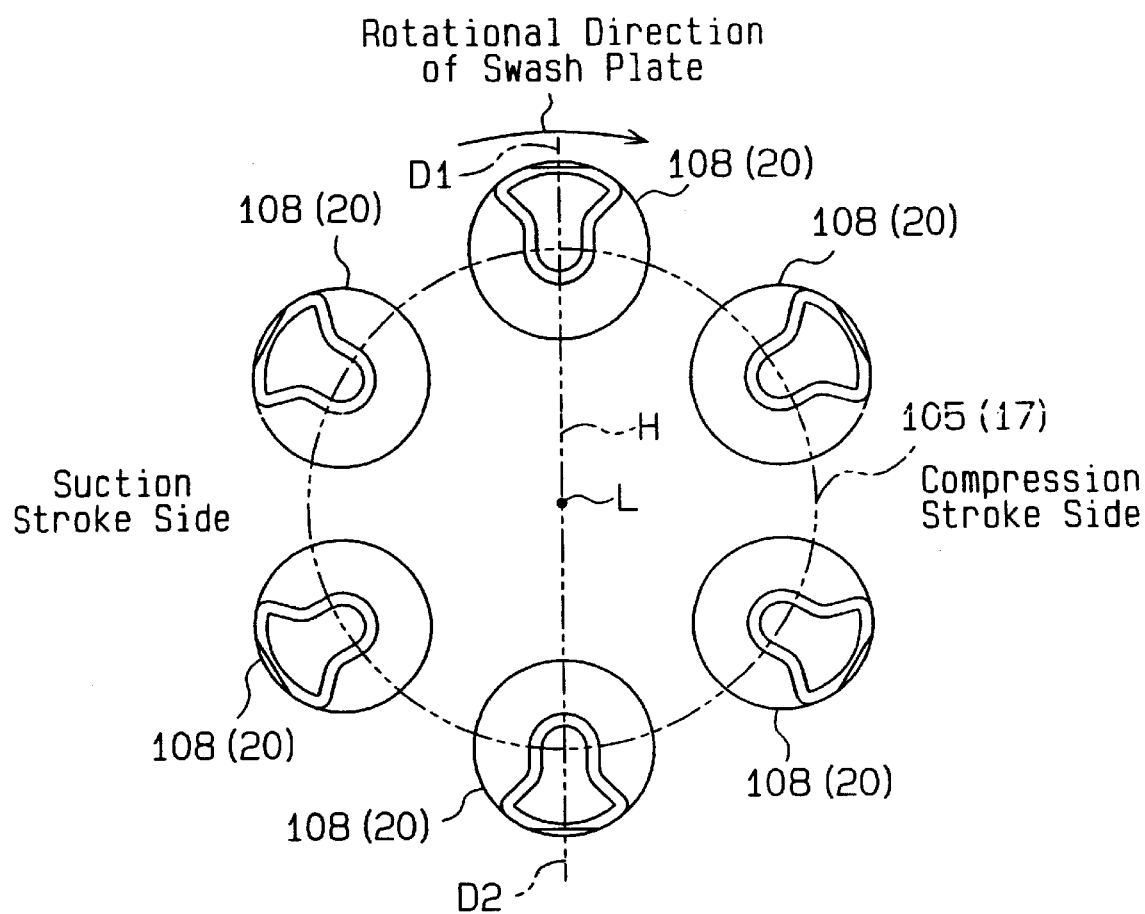
FIG. 10 is a diagrammatic view illustrating the arrangement of the pistons about the axis of the drive shaft.

Like the prior art compressor of FIG. 10, six cylinder bores 19 are equally spaced from the axis L and are arranged at equal intervals. Single head pistons 20 are accommodated in the cylinder bores 19. The pistons 20 are coupled to the periphery of the swash plate 17 through the shoes 21. Rotation of the drive shaft 15 is converted into reciprocation of the pistons 20 through the lug plate 16, the hinge mechanism 18, the swash plate 17, and the shoes 21. The lug plate 16, the swash plate 17, and the hinge mechanism 18 form piston-driving parts.

A suction chamber 22 and a discharge chamber 23 are formed in the rear housing member 13. An external drive source such as a vehicle engine (not shown) rotates the drive shaft 15, which reciprocates the pistons 20. When each piston 20 moves from the top dead center to the bottom dead center, refrigerant gas in the suction chamber 22 is drawn to the corresponding cylinder bore 19 through a corresponding suction valve 24. When each piston moves from the bottom dead center to the top dead center, refrigerant gas in the corresponding cylinder bore 19 is compressed to a predetermined pressure and is discharged to the discharge chamber 23 through a corresponding discharge valve 25.

A pressurizing passage 26 connects the discharge chamber 23 to the crank chamber 14. A displacement control valve 27, which is an electromagnetic valve, is located in the pressurizing passage 26. The control valve 27 opens and closes the pressurizing passage 26 by exciting and de-exciting a solenoid 27a in accordance with external signals, which are determined by the cooling load and the On/Off state of an air-conditioning switch (not shown). The control valve 27 adjusts the opening size of the pressurizing passage 26 and the flow rate of high pressure refrigerant gas to the crank chamber 14, which varies the pressure in the crank chamber 14. Accordingly, the difference between the pressure in the crank chamber 14 and that in the cylinder bores 19 is varied, which varies the inclination of the swash plate 17 and controls the displacement.

Characteristics of the present embodiment will now be described.

As shown in FIGS. 1–3, a thrust bearing 30, which is a roller bearing, includes a front (left in FIG. 1) annular race 31, a rear annular race 32, and rolling elements, or rollers 33, which are radially arranged about the axis L between the races 31, 32.

A front annular seat 34 is concentric with the drive shaft 15 and is formed on an inner wall 11a of the front housing member 11. A rear annular seat 35 is concentric with the drive shaft 15 and is formed on the front-end surface of the lug plate 16. The front race 31 is seated on the front annular seat 34, and the rear race 32 is seated on the rear annular seat 35. Accordingly, the thrust bearing 30 is held by the front and rear annular seats 34, 35 and is located between the front housing member 11 and the lug plate 16.

The front annular seat 34 includes a flat pressure-receiving surface 34a. The rear annular seat 35 includes a flat pressure-receiving surface 35a. The diameter of the front annular seat 34 is different from that of the rear annular seat 35. The front annular seat 34 is located radially outward of the rear annular seat 35. Accordingly, the pressure-receiving surface 34a of the front seat 34 contacts a peripheral front surface of the front race 31, and the pressure-receiving surface 35a of the rear seat 35 contacts an inner rear surface of the rear race 32.

When the piston-driving parts 16–18 rotate, the rollers 33 in the thrust bearing 30 roll on the front and rear races 31, 32 about the axis L. As shown in FIGS. 2 and 3, when no thrust load is applied to the thrust bearing 30, the inner diameter R1 of the contact area between the pressure-receiving surface 34a and the front race 31 is substantially equal to the outer diameter R2 of the path of the rollers 33. The outer diameter R3 of the contact area between the pressure-receiving surface 35a and the rear race 32 is substantially equal to the inner diameter R4 of the path of the rollers 33.

An inclination moment is applied to the piston-driving parts 16–18. The inclination moment, which is based on the compression load, inclines the piston-driving parts 16–18 relative to the housing members 11–13. Therefore, the lug plate 16 presses an inner part of the thrust bearing 30 in a thrust direction through the rear annular seat 35. On the other hand, the front annular seat 34 supports an outer part of the thrust bearing 30. Accordingly, as shown in FIG. 4, the front and rear races 31, 32, which are pressed in the thrust direction, are inclined and elastically deformed. However, a part of the lug plate 16 that is opposite to the part pressing the thrust bearing 30 (with respect to the axis L) is hardly separated from the front housing 11, which prevents the thrust bearing 30 from chattering.

Figure 9:
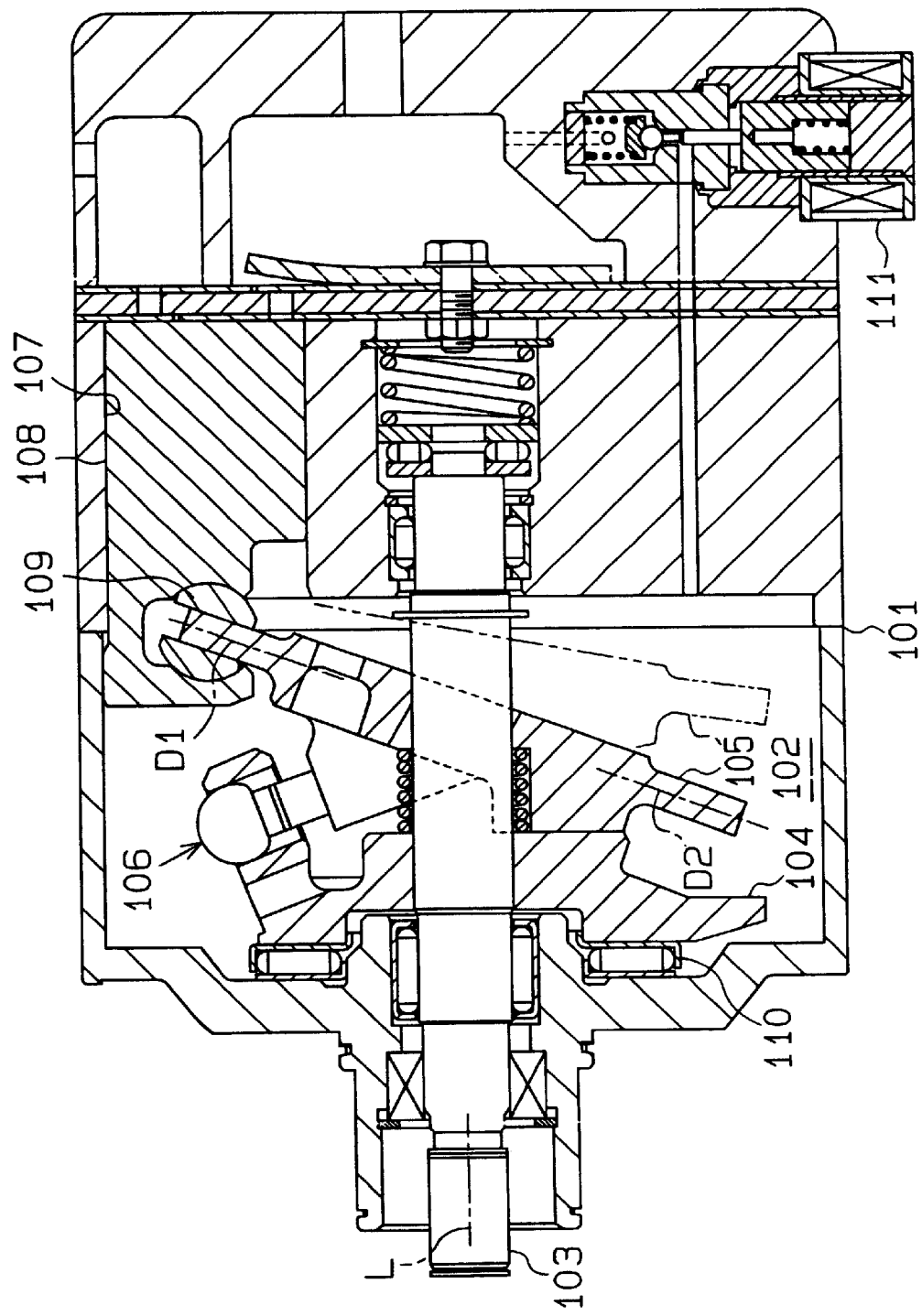
FIG. 9 is a longitudinal cross-sectional view of a prior art variable displacement compressor.

In the prior art of FIGS. 9 and 10, the trust bearing 110 is rigidly held between the housing 101 and the lug plate 104. In this case, the inclination of the piston-driving parts 104–106 causes a part of the lug plate 104 to contact the thrust bearing 110 in the manner of a fulcrum. An opposite part of the lug plate 104 with respect to the axis L is separated from the housing 101 by a significant distance. In the embodiment of FIG. 2, when the piston-driving parts 16–18 incline, a part of the lug plate 16 opposite to a part of the lug plate 16 pressing the thrust bearing 30 acts as a fulcrum. Accordingly, the change of the distance from the opposite part to the front housing member 11 is small, that is, the thrust bearing 30, which is held between the opposite part and the front housing member 11, is stable.

The illustrated embodiment has the following advantages.

(1) The diameters of the front seat 34 and the rear seat 35 are different, and the front and rear races 31, 32 deform elastically when thrust load is applied. Accordingly, chattering of the thrust bearing 30 is prevented when the piston-driving parts 16–18 are inclined, which prevents noise and vibration.

(2) The front annular seat 34 is located radially outward of the rear annular seat 35. Accordingly, a part of the front housing member 11 supporting the thrust bearing 30 is radially outward of a part of the thrust bearing 30 supporting the piston-driving parts 16–18. As a result, the front housing member 11 receives the thrust load from the piston-driving parts 16–18 in a wider area of the housing 11. This reduces the inclination of the piston-driving parts 16–18 compared to, for example, the embodiment of FIG. 7.

(3) Suppose that the inner diameter R1 of the contact area between the pressure-receiving surface 34a and the front race 31 is smaller than the outer diameter R2 of the path of the rollers 33 on the races 31, 32 when no thrust load is applied to the thrust bearing 30. In this case, the portion of the thrust load from the piston-driving part 16–18 that is directly transmitted to the front annular seat 34 increases. Accordingly, the bending load applied to the front race 31 is too small, which may prevent the front race 31 from elastically deforming to a sufficient degree.

In contrast, suppose that the inner diameter R1 is greater than the outer diameter R2. In this case, the bending load applied to the front race 31 is too high, which may cause plastic deformation on the front race 31 along the inner rim of the front annular seat 34.

However, in the present embodiment, the inner diameter R1 is substantially equal to the outer diameter R2, which solves the described problems.

(4) Suppose that the outer diameter R3 of the contact area between the pressure-receiving surface 35a and the rear race 32 is smaller than the inner diameter R4 of the path of the rollers 33 on the races 31, 32. In this case, the bending load applied to the rear race 32 is too high, which may cause a plastic deformation on the rear race 32 along the outer rim of the rear annular seat 35.

In contrast, suppose that the outer diameter R3 is greater than the inner diameter R4. In this case, the portion of the thrust load from the piston-driving parts 16–18 that is directly transmitted to the rollers 33 through the rear annular seat 35 increases. Accordingly, the bending load applied to the rear race 32 decreases too much, which may prevent the rear race 32 from elastically deforming.

However, in the present embodiment, the outer diameter R3 is substantially equal to the inner diameter R4, which solves the illustrated problems.

(5) In the variable displacement compressor, the pressure in the crank chamber 14 is increased to reduce the displacement, which increases the inclination moment applied to the piston-driving parts 16–18. Accordingly, noise and vibration due to the inclination of the piston-driving parts 16–18 relative to the housing members 11–13 are more likely to occur compared to a fixed displacement compressor. Therefore, the present invention is especially effective in variable displacement compressors.

(6) The displacement control valve 27 is an electromagnetic valve controlled by external signals. As mentioned in the description of the prior art, in a compressor having the electromagnetic control valve, there is a case in which the control valve decreases the displacement when the discharge pressure is high, for example, when the air-conditioning switch is turned off. This increases the inclination moment applied to the piston-driving parts 16–18. Accordingly, compared to using a pressure sensitive control valve, which controls the opening size of the pressurizing passage 26 in accordance with the pressure in the suction chamber 22, noise and vibration due to the inclination of the piston-driving parts relative to the housing members 11–13 are more likely to occur. The present invention is especially effective in this type of compressor.

Second Embodiment

Figure 6:
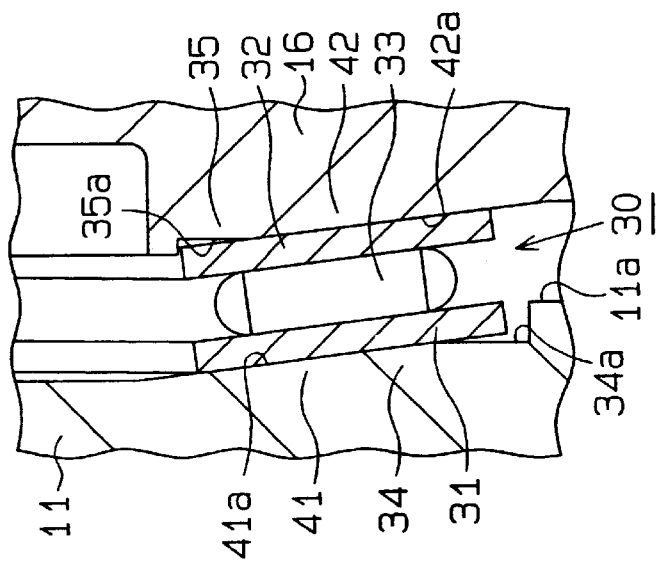
FIG. 6 is a partial enlarged cross-sectional view illustrating elastic deformation of races of the thrust bearing.

FIGS. 5 and 6 show a second embodiment. A front annular limit portion 41 is located on the inner wall 11a of the front housing 11 radially inward of the front annular seat 34. A rear annular limit portion 42 is located on the front-end surface of the lug plate 16 radially outward of the rear annular seat 35. The front and rear limit portions 41, 42 respectively have limit surfaces 41a, 42a, which face the corresponding surfaces of the races 31, 32. The limit surface 41a of the front limit portion 41 is connected to the pressure-receiving surface 34a of the front annular seat 34 and has a tapered surface that increases in distance from the thrust bearing 30 toward the axis L of the drive shaft 15. The limit surface 42a of the rear limit portion 42 is connected to the pressure-receiving surface 35a of the rear annular seat 35 and has a tapered surface that increases in distance from the thrust bearing 30 in a radially outward direction.

The present embodiment has the following advantages in addition to those of the first embodiment.

(1) As shown in FIG. 6, elastic deformation of the races 31, 32 when the thrust load is applied is limited by the abutment of the races 31, 32 against the limit surfaces 41a, 42a. In other words, the movement of the piston-driving parts 16–18 toward the front housing 11 is limited, which prevents the pistons 20 from moving toward the front housing 11. This prevents misalignment of the pistons 20 at the top dead center positions, which limits the unused spaces, or top clearances, in the cylinder bores 19 and increases the efficiency of the compressor.

(2) The thrust load applied to the thrust bearing 30 is also transmitted through the limit surfaces 41a, 42a in addition to the annular seats 34, 35. Accordingly, concentration of stresses on the races 31, 32 is prevented, which extends the life of the thrust bearing 30.

The present invention can further be embodied as follows.

Figure 7:
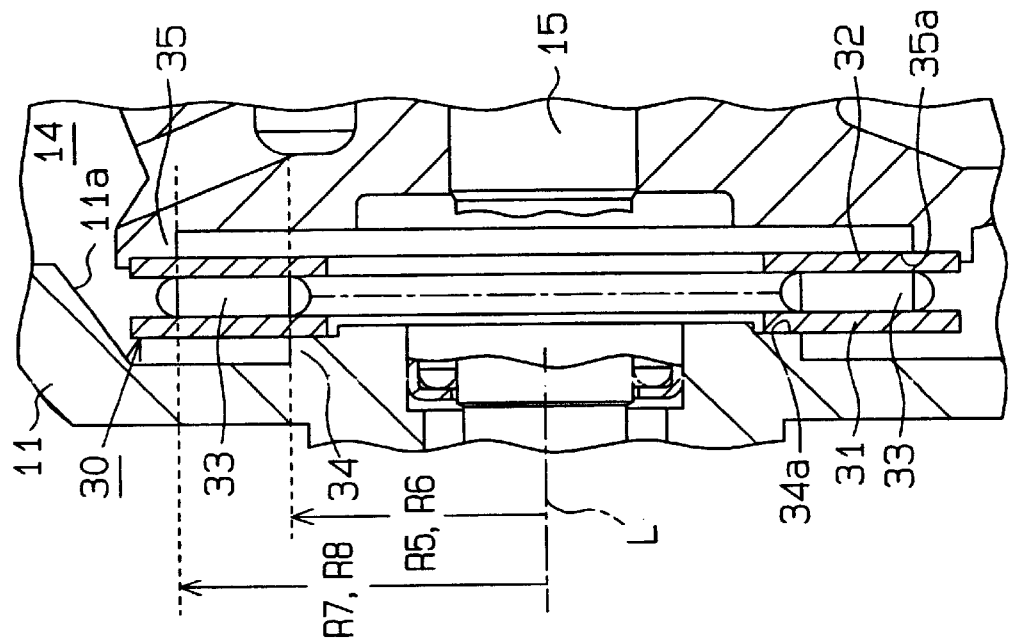
FIG. 7 is a partial enlarged cross-sectional view showing a thrust bearing according to a further embodiment.

As shown in FIG. 7, the front annular seat 34 may be located radially inward of the rear annular seat 35. In this case, the outer diameter R5 of the contact area between the pressure-receiving surface 34a and the front race 31 is substantially equal to the inner diameter R6 of the path of the rollers 33. Also, the inner diameter R7 of the contact area between the pressure-receiving surface 35a and the rear race 32 is substantially equal to the outer diameter R8 of the path of the rollers 33. The present embodiment has the advantages (1), (3)–(6) of the first embodiment.

Figure 8:
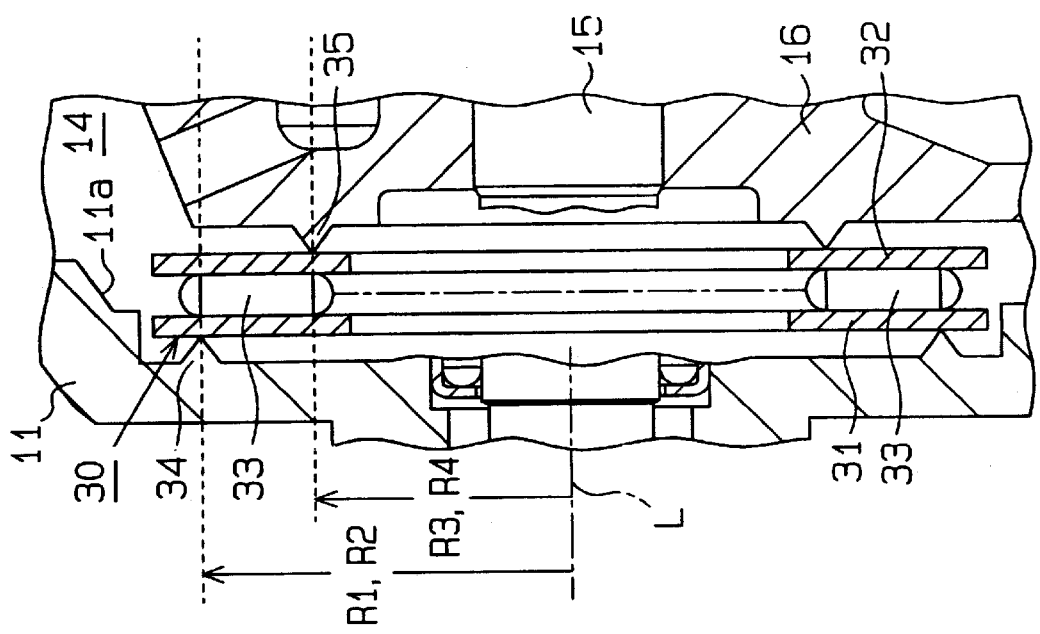
FIG. 8 is a partial enlarged cross-sectional view showing a thrust bearing according to a still further embodiment.

As shown in FIG. 8, the front and rear annular seats 34, 35 may be acute projections. The present embodiment has the same advantages as the first embodiment.

In any of the above embodiments, balls may be used instead of the rollers 33 in the thrust bearing 30.

The present invention may be applied to fixed displacement compressors.

The present invention may also be applied to wobble piston-type compressors.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A piston-type compressor, which includes a housing having a crank chamber and cylinder bores, wherein pistons are located in the corresponding cylinder bores, a drive shaft is supported by the housing and passes through the crank chamber, a piston-driving part is supported by the drive shaft in the crank chamber to rotate integrally with the drive shaft, the pistons are coupled to the piston-driving part, and gas in the cylinder bores is compressed when rotation of the drive shaft is converted into reciprocation of the pistons through the piston-driving part, the compressor comprising:

a thrust bearing, which is located between the housing and the piston-driving part and receives a thrust load applied to the piston-driving part, wherein the thrust bearing includes front and rear races and rolling elements located between the races, wherein the front race is located between the rear race and the housing and the rear race is located between the front race and the piston-driving part;

a front seat formed on the housing for supporting the front race, wherein the front seat is annular and has an inner diameter; and a rear seat formed on the piston-driving part for supporting the rear race, wherein the rear seat is annular and has an outer diameter, and wherein the inner diameter of the front seat is larger than the outer diameter of the rear seat, which causes elastic deformation of the races when a thrust load is applied to the thrust bearing.

2. A piston-type compressor according to claim 1, wherein the outer diameter of the path of the rolling elements on the front and rear races is substantially equal to the inner diameter of the front seat.

3. A piston-type compressor according to claim 2, wherein the inner diameter of the path of the rolling elements on the front and rear races is substantially equal to the outer diameter of the rear seat.

4. A piston-type compressor according to claim 3, wherein at least one of the housing and the piston-driving part includes a limit surface for limiting elastic deformation of the corresponding race.

5. A piston-type compressor according to claim 1 including a displacement control valve, which varies the pressure in the crank chamber to vary the compressor displacement.

6. A piston-type compressor according to claim 5, wherein the control valve is operated by external signals.

7. A piston-type compressor comprising:

a housing;

a crank chamber and cylinder bores formed in the housing;

a piston reciprocally accommodated in each cylinder bore;

a drive shaft supported by the housing and passing through the crank chamber;

a piston-driving part supported by the drive shaft in the crank chamber to rotate integrally with the drive shaft, wherein the piston-driving part includes a lug plate fixed to the drive shaft, a swash plate, which is supported by the drive shaft to incline and is coupled to the pistons, and a hinge mechanism for coupling the swash plate to the lug plate;

wherein rotation of the drive shaft is converted into reciprocation of the pistons by the lug plate, the hinge mechanism, and the swash plate of the piston-driving part, such that gas is compressed in the cylinder bores;

a thrust bearing located between the housing and the lug plate for receiving a thrust load applied to the piston-driving part, wherein the thrust bearing includes a front race adjacent to the housing, a rear race adjacent to the lug plate, and rolling elements located between the front and rear races;

a front seat located on the housing for supporting the front race, wherein the front seat is annular and has an inner diameter; and a rear seat located on the lug plate for supporting the rear race, wherein the rear seat is annular and has an outer diameter, and wherein the inner diameter of the front seat is larger than the outer diameter of the rear seat, which causes elastic deformation of the front and rear races when a thrust load is applied to the thrust bearing.

8. A piston-type compressor according to claim 7, wherein the front and rear seats are annular.

9. A piston-type compressor according to claim 8, wherein the front seat is located radially outward of the rear seat.

10. A piston-type compressor according to claim 9, wherein the outer diameter of the path of the rolling elements on the front and rear races is substantially equal to the inner diameter of the front seat.

11. A piston-type compressor according to claim 10, wherein the inner diameter of the path of the rolling elements on the front and rear races is substantially equal to the outer diameter of the rear seat.

12. A piston-type compressor according to claim 11, wherein at least one of the housing and the piston-driving part includes a limit surface for limiting elastic deformation of the corresponding race.

13. A piston-type compressor according to claim 7 including a displacement control valve for adjusting the pressure in the crank chamber to vary the compressor displacement.

14. A piston-type compressor according to claim 13, wherein the control valve is operated by external signals.

* * * * *

UNITED STATES PATENT AND TRADEMARK OFFICE
CERTIFICATE OF CORRECTION

PATENT NO. : 6,338,613 B1
DATED : January 15, 2002
INVENTOR(S) : Okuno et al.

It is certified that error appears in the above-identified patent and that said Letters Patent is hereby corrected as shown below:

<u>Column 5,</u>
Line 18, please delete "trust" and insert therefor -- thrust --

Signed and Sealed this

Twenty-first Day of May, 2002

*Attest:*

*Attesting Officer*

JAMES E. ROGAN
*Director of the United States Patent and Trademark Office*